Sept. 20, 1960            R. GLAVAN            2,952,899
METHOD FOR MAKING FLANGE TYPE SELF-ALIGNING BEARINGS
Filed Nov. 21, 1957            4 Sheets-Sheet 1
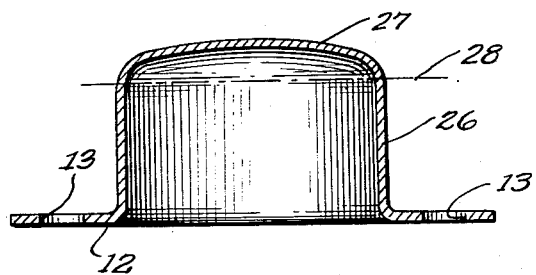
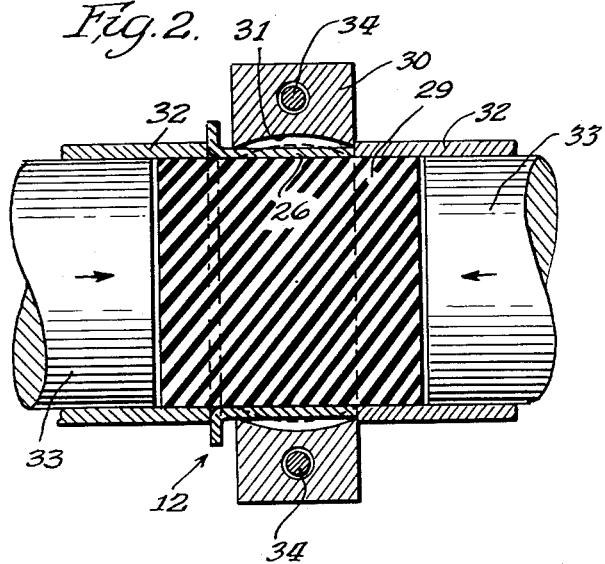
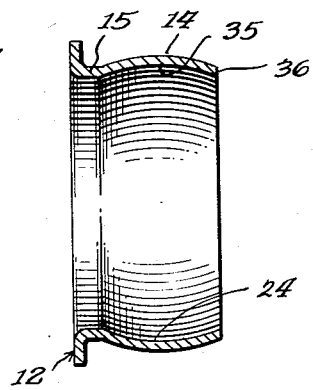
Inventor
Richard Glavan
By Mann, Brown & McWilliams,
Attys.

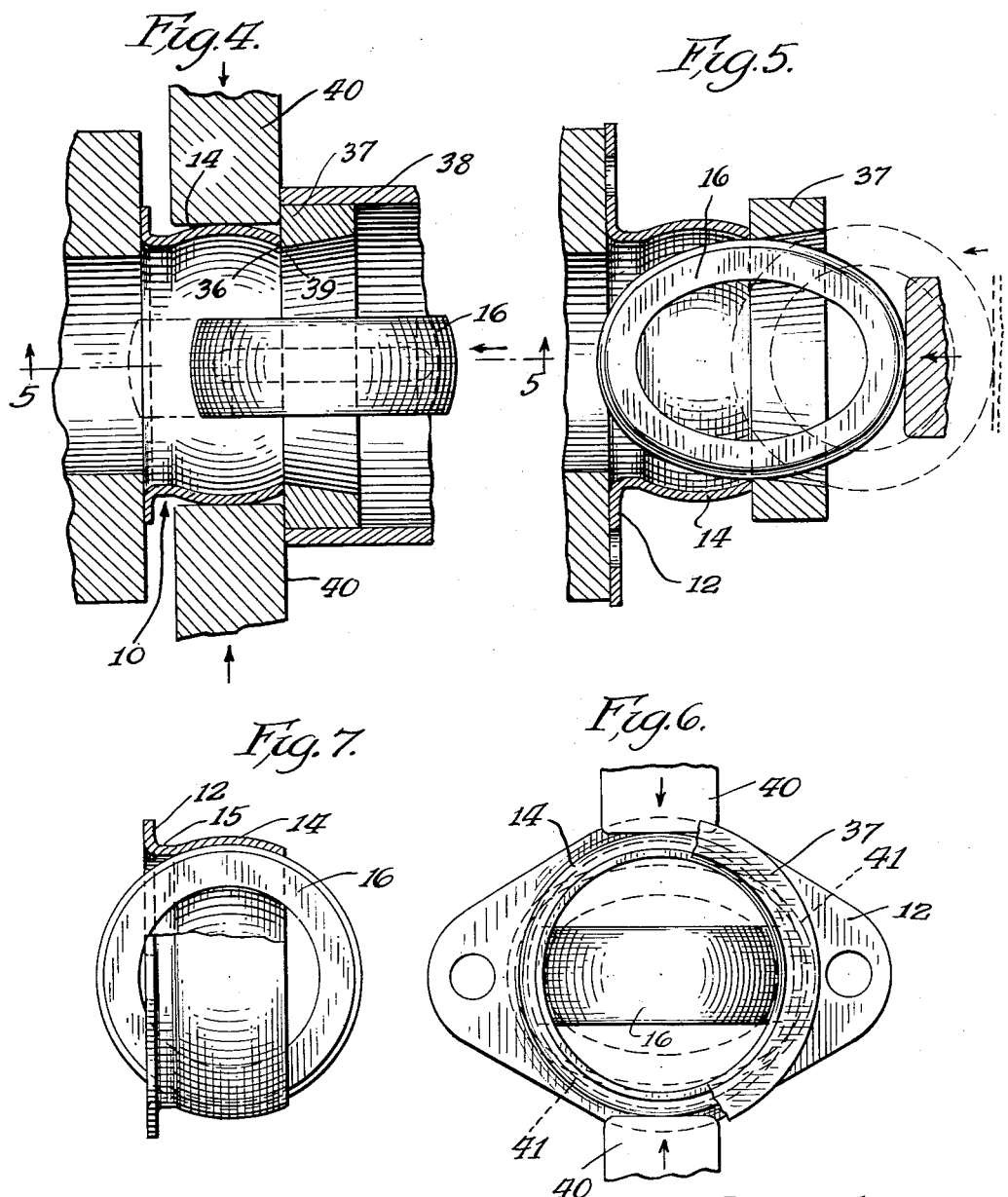

Sept. 20, 1960  R. GLAVAN  2,952,899
METHOD FOR MAKING FLANGE TYPE SELF-ALIGNING BEARINGS
Filed Nov. 21, 1957  4 Sheets-Sheet 3

Inventor
Richard Glavan
By Mann, Brown & McWilliams,
Attys.

Sept. 20, 1960  R. GLAVAN  2,952,899
METHOD FOR MAKING FLANGE TYPE SELF-ALIGNING BEARINGS
Filed Nov. 21, 1957  4 Sheets-Sheet 4

Inventor
Richard Glavan.
By
Mann, Brown & McWilliams
Attys

United States Patent Office 2,952,899
Patented Sept. 20, 1960

2,952,899
METHOD FOR MAKING FLANGE TYPE SELF-ALIGNING BEARINGS

Richard Glavan, Joliet, Ill., assignor to Stephens-Adamson Mfg. Co., a corporation of Illinois Filed Nov. 21, 1957, Ser. No. 697,842
2 Claims. (Cl. 29—148.4)

This invention relates to a novel method for making a stamped flange type self-aligning rolling bearing unit.

The housings of most stamped flange type self-aligning rolling bearing units on the market today are made in two pieces and then clamped together over the bearing assembly. The necessity for this arises out of the fact that the outer race of the bearing assembly must be spherically shaped to coact with a correspondingly shaped inner surface in the bearing support portion of the housing; and, in order for the bearing assembly to be mounted in such support, the two-piece housing has proved to be the most expedient solution to the problem.

There have been instances in which one-piece housings have been used, but in such cases a mounting slot is necessarily provided in order to insert the bearing assembly endwise into position, after which it is rotated about a transverse axis to its operative position. These slots have the disadvantage of weakening the support for the bearing assembly and substantially reducing the thrust load which such bearing units are unable to withstand.

Still other attempts have been made to use a one-piece housing for bearing units of this type, but none has provided a housing which has an uninterrupted spherical bearing seat for the bearing, which is, of course, necessary if the bearing unit is to withstand maximum thrust loads.

One of the problems which arises in fabricating bearing units of this type is that any attempt to form the housing over the rolling bearing assembly either causes, or is apt to cause, Brinelling of the bearing. This is one of the reasons why the two-piece stamped housing has been the most commonly accepted expedient for making flange type self-aligning rolling bearings.

The principal object of this invention, therefore, is to provide a novel method for making a stamped flange type self-aligning rolling bearing unit in which the bearing housing is of unitary construction and has a spherical seat for the outer race of the bearing assembly that is characterized by uniform width and complete continuity of the bearing supporting surface. This, of course, is not intended to exclude a lubricating opening or fitting, if such is desired, or other like inconsequential discontinuities.

Further objects are to provide a method of fabricating bearing units of the aforementioned type in which there is no opportunity for Brinelling of the bearing to occur; to reduce the cost of manufacture of bearing units of this type; and to provide a bearing unit having an improved ability of withstanding thrust loads.

Further and other objects of the invention will be apparent as the disclosure proceeds and the description is read in conjunction with the accompanying drawings, in which:

Fig. 1 is a vertical cross-sectional view showing a preliminary stage in forming the blank used in making the bearing housing;

Fig. 2 shows one way in which the concave spherical seat may be formed in the bearing housing;

Fig. 3 is a cross-sectional view of the housing after the spherical seat has been formed therein;

Fig. 4 shows the application of the outer bearing race of the rolling bearing unit by forcing it through a squeeze ring;

Fig. 5 is a sectional view taken on the line 5—5 of Fig. 4, but showing the outer bearing race in elevation;

Fig. 6 is a front view illustrating the application of the outer bearing race to the housing;

Fig. 7 shows the outer bearing race in place within the housing, but before it is rotated to its normal operating position;

Fig. 10 is a perspective view showing the completed bearing unit;

Fig. 11 is a vertical cross-sectional view of the assembled bearing unit; and

Fig. 12 illustrates a pillow block bearing unit made by my method.

Figure 8:
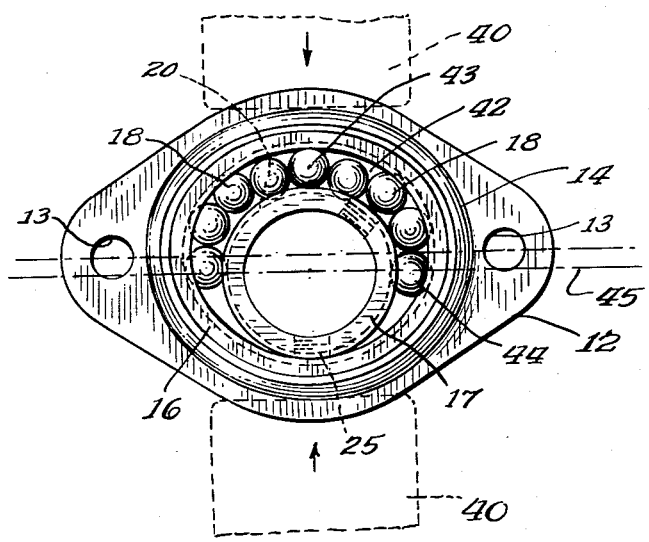
Fig. 8 is a somewhat diagrammatic view illustrating the manner in which a maximum number of balls may be inserted into the bearing while being assembled after the outer race has been mounted in the housing.

Before describing my improved method for making a stamped flange type rolling bearing of the self-aligning type, it will be convenient to first describe the product produced by my method.

By referring to Figs. 10 and 11, it will be seen that the complete bearing unit comprises a housing, generally designated 10, fabricated from sheet metal and having permanently mounted within the housing a bearing assembly, generally designated 11.

The housing 10 comprises a coplanar flange portion or base 12 provided with mounting holes 13, and integrally rising from the base is a spherically contoured bearing seat 14, which is completely above the plane of the base and is connected thereto by a short cylindrical section 15. The bearing seat 14 of the housing is of substantially uniform width throughout its entire periphery and is continuous, as distinguished from conventional flange type housing which are provided with mounting slots for the bearing assembly.

The bearing assembly 11 comprises an outer race 16, usually of steel, and an inner race 17, with balls 18 mounted therebetween and traveling in deep grooves 19 and 20 formed in the outer and inner races respectively. The balls are held in their proper spaced relationship about the inner race by retaining rings 21, as is conventional, and the ends of the bearing are sealed with suitable sealing rings 22.

The outer race 16 has a spherically contoured periphery, as indicated at 23, which corresponds in shape to the inner concave wall 24 of the bearing seat 14 of the housing. There is freedom of movement between the outer race 16 and the bearing seat 14, which permits the bearing assembly as a whole to have limited universal movement with respect to the housing, and thereby provide the self-aligning feature of the bearing unit.

The inner race 17 is a tubular sleeve, one end of which projects beyond the housing 10 to accommodate shaft set screws, the tapped holes for which are indicated at 25.

The first step in producing a bearing structure such as just described consists in punching out the base 12 of the housing with its mounting apertures 13, and drawing from the central portion a relatively deep cup, such as shown in Fig. 1. The side walls 26 of the cup are cylindrical in form, and after the cup has been drawn the bottom portion 27 of the cup is cut off along the dotted line 28 to produce the blank that is used in making the bearing housing.

After the blank has been formed in the manner described, the next step is to form the bearing seat portion 14, and this may be done in a number of ways, as for example, by spinning. I prefer, however, to use what is known as the Hydroform process, which employs equipment made by the Cincinnati Milling Machine Co. of Cincinnati, Ohio, and consists primarily of employing a hard rubber plug 29 while supporting the housing blank within a die 30 provided with a spherically contoured annular cavity 31. The plug 29 has an external diameter corresponding to the internal diameter of the cylindrical portion 26 of the blank, and it is held confined outside of the blank by sleeves 32. Opposed rams 33 are mounted within the sleeves 32 and abut the rubber plug 29, so that when inward pressure is exerted upon the rubber plug 29 it expands the wall 26 into contact with the cavity 31 of the die and permanently deforms the wall to that shape, thereby forming the bearing seat 14.

It will be understood, of course, that the exact depth of the cavity 31 takes into account the tendency of the wall 26 to spring back to its original form after deformation, and all that is required is that the cavity 31 be deep enough and appropriately shaped so that when the springback occurs the desired spherically shaped bearing seat 14 has been produced.

The die 30 is made in two parts held together in any suitable manner, as by clamping bolts 34 or cams or the like, so that after the seat 14 has been formed, the piece may be removed from the die.

Since the internal diameter of the bearing seat 14 is greatest at the point 35 (see Figure 3) and somewhat less at the point 36 adjacent the facing of the housing, the problem is to find a way in which the rolling bearing may be mounted within the housing. According to the method of this invention, this is accomplished, by, first, deforming the outer bearing race within its elastic limits but sufficiently so that it may be inserted endwise past the point 36 of the bearing seat, and then rotating the outer race to operative position, and finally completing the assembly of the bearing. This part of my process is shown particularly in Figs. 4–7, inclusive, and by referring to these figures it will be seen that the housing is suitably supported in a fixture which includes a tapered squeeze ring 37 positioned adjacent to the end of seat 14 of the housing and held in place by sleeve 38. The internal diameter of the squeeze ring at the point 39 is equal to or slightly less than the internal diameter of the bearing seat 14 at the point 36, so that it is possible to insert the outer race 16 of the bearing endwise into the housing by forcing it through the squeeze ring by proceeding as indicated in Figs. 4–6. This has the effect of temporarily making the outer race more or less elliptical in shape; but, since this operation does not take the metal of the outer race beyond its elastic limit, the outer race springs back into circular shape as soon as it snaps into the seat 14. This is best shown in Fig. 7. Thereafter, the ring is rotated about one of its transverse axes by 90 degrees to its operative position.

In some instances, insertion of the outer race 16 into the bearing housing may be aided by slightly deforming the housing with pressures exerted at right angles to the pressures used in deforming the outer race. In this way, the required distortion of shape in order to mount the outer bearing race within the housing is distributed between the metal of the two parts. This is shown best in Figs. 4 and 6, which show inwardly directed pressures being applied in the direction of the arrows against the bearing seat 14 of the housing by movable heads 40, which tend to distort the bearing seat to elliptical shape, as shown in dotted lines at 41 in Fig. 6. Since the major axis of this ellipse is normal to the major axis of the outer race when distorted to elliptical shape by the squeeze ring 37, the assembly of the outer race within the housing is facilitated. When the outer race snaps into the position of Figure 7, the pressure on the housing is released and the race rotated 90 degrees to its operative position.

It will, of course, be understood that the deformed shapes of the outer race 16 and housing 10 are exaggerated in the drawings in order to better illustrate the principles involved.

Figure 9:
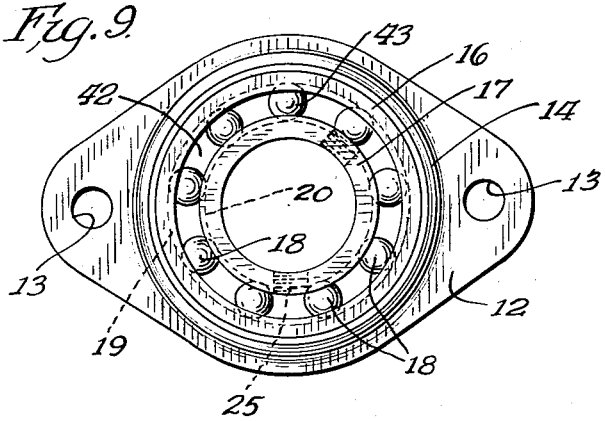
Fig. 9 is a view corresponding to Fig. 8 but showing the inner race brought back to its normal position with the balls properly spaced about the bearing.

The rest of the rolling bearing is then assembled, and this may be accomplished while the bearing housing is still mounted in the fixture, where it may be subjected to the vise-like action of the heads 40. The squeeze ring 37 and the supporting sleeve 38 are removed, and the inner race placed within the outer race but eccentric thereto (see Fig. 8), thereby forming the crescent shaped space 42 into which the balls 18 may be placed. In order to have maximum load carrying capacity, it is desirable to introduce into the bearing as many balls as possible, and an additional ball (i.e., one more than could be inserted in the crescent shaped space 42 without employing the steps which follow) may be inserted by again exerting pressure on the pressure heads 40 to deform the bearing seat 14 and its contained outer race 16 to elliptical shape, as shown in Fig. 8, which has the effect of enlarging the side portions of the crescent shaped space 42 and permitting an additional ball, such as the ball 43, to be forced downwardly into the bearing space, which in turn forces an end ball, such as the ball 44, beyond the center line 45 of the inner race. When pressure is released on the heads 40, the balls may then be properly distributed about the periphery of the inner race, as shown in Fig. 9. Thereafter, the retaining rings 21 are applied, and finally the sealing rings 22, to complete the bearing assembly.

It will be obvious that my method is applicable to other types of bearing units that include a housing formed from materials such as those above specified, as illustrated by Figure 12, which shows a pillow block bearing unit 50 produced by my method. Unit 50 includes a bearing assembly 11 mounted in bearing seat 14a of stamped pillow block housing 10a that is formed from sheet metal, as by punching out flange portion 12a and integral base 52 and deep-drawing a cup having cylindrical side wall 26, the bottom of which is removed as described above. Base 52 is appropriately formed with bolt or screw holes 54. Seat 14a is formed and the outer race 16 applied thereto in the same manner as described above, and the bearing assembly completed as also described above.

Therefore, the term "flange type rolling bearing" as used in the appended claims is intended to mean all rolling bearings that include a housing formed from the materials specified above regardless of the particular manner in which the housing is shaped for purposes of mounting the unit in operating position.

It will be seen that my method is readily adaptable to mass production techniques and involves no expensive tooling or machine operations. Bearing units of high quality may be made by this process at substantially less cost than presently used methods.

The term "rolling bearing" as used in this specification and in the appended claims is intended to include all forms of bearing units in which one or more members or elements are rolled between inner and outer race members. This term is thus meant to include units employing single and multiple rows of balls, rollers, and the like, and thus is synonymous with the term "antifriction bearing" widely used in the bearing art, and is to be distinguished from plain type bearings and bearing units.

The terms "bearing" and "bearing assembly" as used in this specification and in the appended claims are intended to mean the combination of the inner and outer race members and the rolling elements associated therewith, whether assembled or unassembled.

This application is closely related to my copending application Ser. No. 697,843, filed concurrently herewith, the disclosure of which is incorporated in its entirety by reference.

I claim:

1. The method of forming a flange type rolling bearing which includes the steps of taking a housing blank having a flange portion provided with an integral cylindrical portion, mounting said cylindrical portion on a resilient cylindrical plug having an external diameter that is complementary to the internal diameter of said cylindrical portion and positioning a die having a concave spherically contoured surface about said cylindrical portion, applying equal compressive forces to the ends of said plug to compress said plug longitudinally to deform said cylindrical portion into conformity with said surface of said die, whereby said cylindrical portion is formed with a concave spherically contoured bearing seat, taking an outer race having an outer spherically contoured surface that is complementary to said bearing seat, forcing said outer race endwise into said seat while at the same time compressing it transversely within its elastic limit, rotating said race into the plane of said seat, eccentrically mounting an inner race within the outer race to form a crescent shaped space between the outer and inner races, filling said crescent shaped space with rolling bearings until a rolling bearing is positioned adjacent the inner and outer races at each end of the crescent shaped space, and no further rolling bearings can be pressed into said space, compressing the bearing seat and said outer race laterally thereof to give said outer race an elliptical configuration with its minor axis extending through the center of said crescent shaped space, and pressing a further rolling bearing into said space, whereby one of the bearings at the ends of said space is forced past the center line of the inner race, and releasing said bearing seat and said outer race, whereby said inner race is positioned concentrically within the outer race, with said rolling bearings positioned between said inner and outer races.

2. The method of making a ball bearing unit of the type in which a ball bearing, including an annular, one-piece outer race and an inner race with a series of balls interposed between the outer race and the inner race, is mounted in a stamped housing, with the periphery of the outer race being spherically contoured and coacting with a correspondingly shaped bearing seat in the housing, whereby the ball bearing is capable of self-alignment with respect to the housing, which method comprises: taking a sheet metal blank, deep drawing a cylindrical cup from the blank, thereby providing a circular upstanding cylindrical wall normal to the remaining flange portion of the blank, removing the closed end of said cup-shaped portion, leaving an upstanding cylindrical wall, then outwardly forming in said upstanding cylindrical wall said spherically contoured bearing seat, taking said one-piece outer race with its spherically contoured periphery and compressing it transversely of its central axis to deform the race, but within its elastic limit, to an elliptical shape, and while in this elliptical shape inserting it endwise into the bearing seat in said cylindrical wall, then allowing the outer race to spring to its normal annular shape within said seat and rotating it into a position in which the central axis of the outer race is substantially coincident with the central axis of the said cylindrical wall, and then completing the ball bearing assembly by inserting the inner race within the outer race and biasing it toward one side of the outer race to thereby form a crescent-shaped space between the inner race and the outer race, introducing said balls into said crescent-shaped space, then centering the inner race and distributing the balls around the periphery thereof, and finally applying retaining means to hold the balls in properly spaced relation around the periphery of the inner race.

References Cited in the file of this patent

UNITED STATES PATENTS

| | | |
|---|---|---|
| 1,668,105 | Crow | May 1, 1928 |
| 1,906,259 | Gibbons | May 2, 1933 |
| 1,943,631 | Skillman | Jan. 16, 1934 |
| 2,582,995 | Laurent | Jan. 22, 1952 |
| 2,633,627 | Olmstead | Apr. 7, 1953 |
| 2,695,446 | Meyer | Nov. 30, 1954 |
| 2,742,873 | Moore | Apr. 24, 1956 |
| 2,794,691 | Noe | June 4, 1957 |